(12) United States Patent
Gas et al.

(10) Patent No.: US 8,531,081 B2
(45) Date of Patent: Sep. 10, 2013

(54) METHOD FOR PRODUCING ROTOR ASSEMBLY FOR ROTATING ELECTRICAL MACHINE, ESPECIALLY ALTERNATOR

(75) Inventors: Olivier Gas, Paris (FR); Pierre-Yves Bilteryst, Brimeux (FR); Alexandre Pfleger, Weyer (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 357 days.

(21) Appl. No.: 12/743,888

(22) PCT Filed: Nov. 24, 2008

(86) PCT No.: PCT/FR2008/052115
§ 371 (c)(1),
(2), (4) Date: Aug. 11, 2010

(87) PCT Pub. No.: WO2009/071827
PCT Pub. Date: Jun. 11, 2009

(65) Prior Publication Data
US 2010/0295400 A1      Nov. 25, 2010

(30) Foreign Application Priority Data
Nov. 26, 2007   (FR) ...................................... 07 59297

(51) Int. Cl.
*H02K 1/22*     (2006.01)
(52) U.S. Cl.
USPC ................... 310/263; 310/156.01; 310/261.1; 335/296; 29/598

(58) Field of Classification Search
USPC ................ 310/263, 156.01, 261.1; 335/296; 29/598
See application file for complete search history.

(56) References Cited

U.S. PATENT DOCUMENTS

| | | | | |
|---|---|---|---|---|
| 2,836,773 | A * | 5/1958 | Skrobisch | 335/229 |
| RE24,943 | E * | 2/1961 | Skrobisch | 335/234 |
| 5,858,158 | A * | 1/1999 | Wong | 156/252 |
| 5,903,084 | A * | 5/1999 | Asao et al. | 310/263 |
| 5,969,459 | A | 10/1999 | Taniguchi et al. | |
| 6,252,330 | B1 | 6/2001 | Asao et al. | |
| 6,424,072 | B1 * | 7/2002 | Armiroli et al. | 310/263 |
| 6,452,301 | B1 * | 9/2002 | Van Dine et al. | 310/156.12 |
| 6,486,585 | B1 * | 11/2002 | Badey et al. | 310/263 |
| 6,548,935 | B1 * | 4/2003 | Shendi et al. | 310/263 |
| 6,710,506 | B2 * | 3/2004 | Ishizuka et al. | 310/263 |
| 7,605,518 | B2 * | 10/2009 | Nakamura | 310/263 |
| 2002/0053855 | A1 * | 5/2002 | Tan et al. | 310/263 |
| 2004/0032183 | A1 | 2/2004 | Nakamura et al. | |
| 2008/0048516 | A1 * | 2/2008 | Oowatari et al. | 310/156.71 |
| 2010/0176681 | A1 * | 7/2010 | Gas et al. | 310/156.45 |

FOREIGN PATENT DOCUMENTS

| | | |
|---|---|---|
| DE | 101 53 578 A1 | 5/2002 |
| GB | 2 331 862 A | 6/1999 |

* cited by examiner

*Primary Examiner* — Tran Nguyen
*Assistant Examiner* — Alex W Mok
(74) *Attorney, Agent, or Firm* — Berenato & White, LLC

(57) ABSTRACT

A method for producing a rotor assembly for a rotating electrical machine, especially an alternator, the rotor assembly including two rotors defining between themselves at least one inter-rotor space suitable for accommodating at least one magnet structure, which includes at least one index mark. The magnet structure is positioned against at least two of the rotors, using the index mark to identify a direction of orientation of the magnetization of the magnet structure.

18 Claims, 5 Drawing Sheets

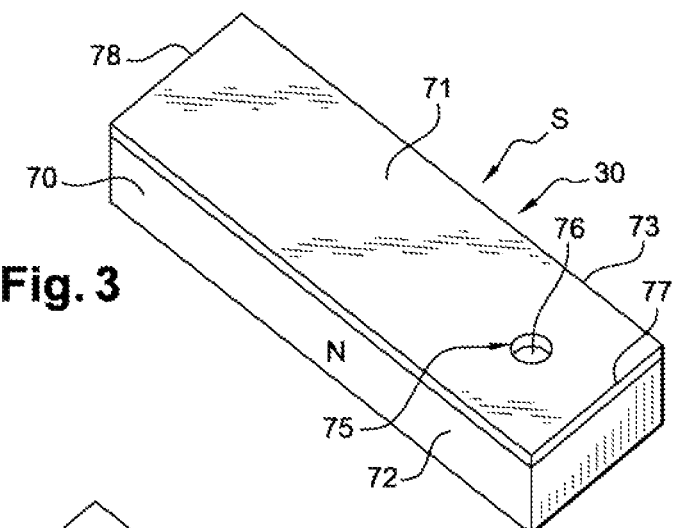
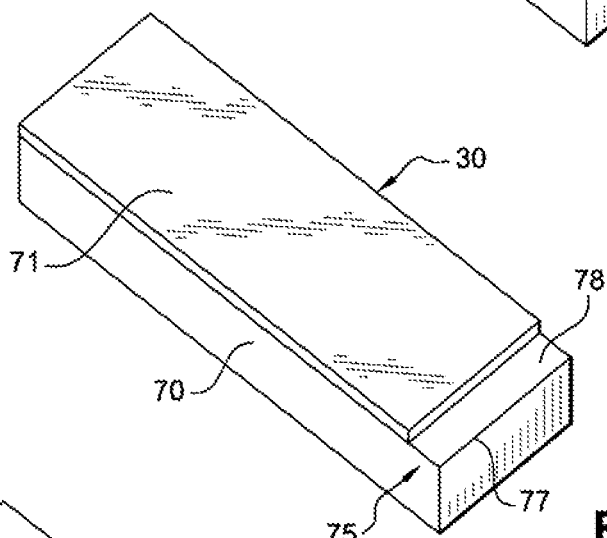
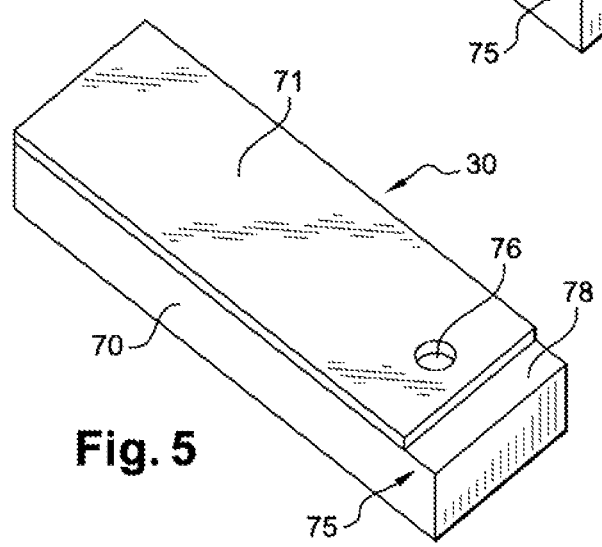

METHOD FOR PRODUCING ROTOR ASSEMBLY FOR ROTATING ELECTRICAL MACHINE, ESPECIALLY ALTERNATOR

FIELD OF THE INVENTION

The invention in particular relates to a method for producing a rotor assembly for a rotating electrical machine, especially an alternator.

BACKGROUND OF THE INVENTION

French Patent FR 2 793 085 describes an alternator for a motor vehicle, comprising a stator and a rotor. The rotor assembly comprises a winding and two rotors each equipped with a plurality of claws. The rotors define between themselves, on a level with the claws, inter-rotor spaces each able to accommodate a permanent magnet structure, in particular made of rare earth. The direction of magnetization of these magnet structures must be alternating from one inter-rotor space to the next. For this purpose, these magnet structures are arranged in two distinct groups, according to their direction of magnetization. However these two groups cannot be distinguished visually. Thus when the magnet structures are assembled in the inter-rotor spaces of the rotor, special care must be taken to select the magnet structures with the correct direction of orientation.

U.S. Pat. No. 7,095,154 describes an alternator rotor assembly comprising permanent magnets held in inter-rotor spaces by means of support elements. Each magnet is positioned in a non-centric way in the corresponding inter-rotor space.

SUMMARY OF THE INVENTION

The invention is aimed in particular at simplifying the method for producing a rotor assembly while avoiding risks of error in assembling the magnet structures.

The object of the invention is thus a method for producing a rotor assembly for a rotating electrical machine, especially an alternator, the rotor assembly comprising two rotors defining between themselves at least one inter-rotor space suitable for accommodating at least one magnet structure, which comprises at least one index mark, the method comprising the following step:

positioning the magnet structure against at least one of the rotors, using the index mark to identify a direction of orientation of the magnetization of the magnet structure.

The presence of index marks according to the invention enables the risk, when assembling the magnet structures on the rotor by orientating them along an incorrect direction of magnetization, to be reduced or even eliminated.

These index marks also make it possible to quickly check if all the magnet structures are correctly positioned in the inter-rotor spaces.

As the case may be the magnet structures can be placed on the rotor all the right way or all the wrong way, and the collector is placed, at the closing of the electrical circuit of the machine, in an adequate configuration depending on the position of the magnet structures observed.

The invention is particularly suited to a method carried out manually.

It is also possible to check the electromagnetic circuit of the electrical machine at the end of assembly.

In an exemplary embodiment of the invention, the magnet structure is positioned against one of the rotors, before they are assembled.

Alternatively, the magnet structure is inserted in an inter-rotor space after the two rotors have been assembled.

Preferably, the index mark of the magnet structure is visible with the naked eye, enabling a person to identify an orientation of magnetization of the magnet structure for example.

As the case may be, in order to magnetize the magnet structures, these are positioned in parallel, along the same direction, when they pass through a magnetizing device.

With the invention it is thus possible to avoid having to magnetize the magnet structures along two different directions and therefore creating two groups of magnets, which simplifies the method.

Moreover by handling magnet structures all with the same orientation of magnetization with respect to the index mark, it is possible to avoid confusion in the various production stages of the rotor assembly. A single magnet structure reference can be used.

Alternatively it is possible, in order to magnetize the magnet structures, to position these in parallel, along an alternating direction, when they pass through a magnetizing device. In this case two magnet structure references can be used.

In an exemplary embodiment of the invention, the rotor assembly comprises a plurality of inter-rotor spaces, each able to accommodate at least one magnet structure, and the method comprises the following step:

starting with a set of magnet structures all having north and south poles directed the same way with respect to the corresponding index mark, selecting and positioning a plurality of magnet structures on at least one of the rotors in the successive inter-rotor spaces, orientated alternating from one inter-rotor space to the other.

The method can comprise the following step:

selecting and making the magnet structure rotate by a chosen angle, in particular using the index mark as reference, in order to place it in an adequate position before positioning it against one of the rotors.

The above steps can be carried out manually or, alternatively, using a robot equipped with an articulated arm.

The object of the invention is equally a magnet structure suitable for mounting in a rotor assembly for a rotating electrical machine, especially an alternator, in particular produced by the method as defined above, characterized in that it comprises at least one index mark suitable for permitting, in particular visually, the direction of magnetization of this magnet structure to be distinguished.

In an exemplary embodiment of the invention, the magnet structure comprises a plate and a magnet positioned against the plate, and the index mark is created at least partially on the plate.

This plate is used in particular to hold the magnet and plays a role of mechanical absorber.

If desired, the index mark comprises at least one orifice or cut formed in the plate.

The index mark can comprise an excess length of the magnet in the continuation of the length of the plate, said excess length only being present on one side of the magnet structure so as to distinguish one side of the magnet from the other.

Alternatively, the plate can have an excess length with respect to the magnet.

This being the case, the index mark is formed by at least two zones having different, in particular optical, electromagnetic properties, being of different colours or reflective properties for example.

These two zones of different optical properties can extend in the length or width of the magnet structure.

The index mark, if desired, is formed by a variation in the thickness of either the plate or the permanent magnet.

In an exemplary embodiment of the invention, the index mark is created at least partially on the magnet.

The index mark may be constituted by an extraction of material, a notch for example, on the magnet or a sign printed on this magnet for example.

Generally the index mark, that it is formed on the magnet or the plate or both at the same time, can be created in various ways, in particular by creating a discontinuity and/or dissymmetry, for example by cutting, notching, printing of an ink visible or invisible with the naked eye, affixing, for example by bonding, a separate element such as an adhesive patch or a label, etc. . . . .

In an exemplary embodiment of the invention, at least one of the magnet structures has a roughly rectangular parallelepipedic shape or alternatively a trapezoidal cross section.

For example, the plate is fixed by adhesive on the magnet.

The object of the invention is equally a rotor assembly comprising two rotors and at least one magnet structure as defined above, mounted in a defined inter-rotor space between the two rotors.

Advantageously all the magnet structures have the same direction of magnetization with respect to the index mark.

Preferably, all the magnet structures of the rotor assembly are identical.

Advantageously the magnet structure comprises a permanent magnet extending over the whole width of the inter-rotor space.

The object of the invention is again a rotating electrical machine, especially an alternator of a motor vehicle, comprising a rotor assembly as mentioned above.

BRIEF DESCRIPTION OF THE DRAWINGS

The invention can be better understood on reading the detailed description below of non-restrictive, exemplary embodiments of the invention, and on examining the appended drawing, wherein.

DETAILED DESCRIPTION

Figure 1:
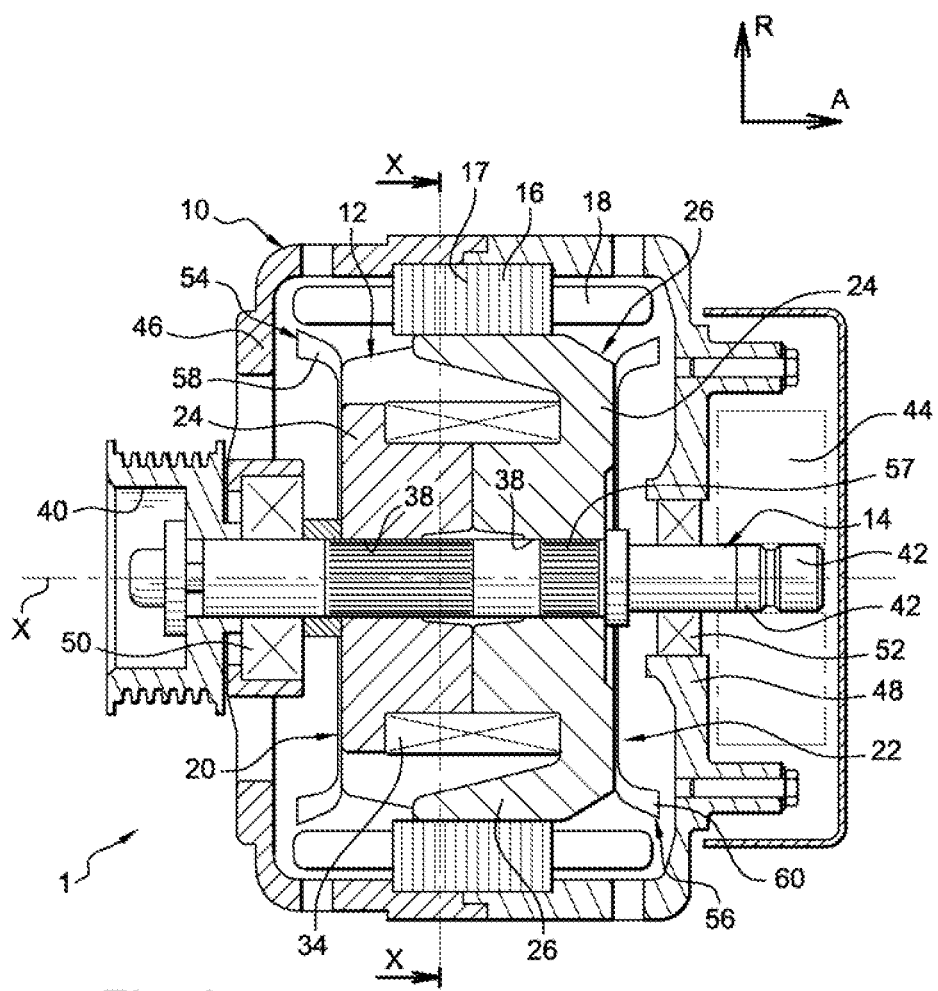
FIG. 1 schematically and partially illustrates in longitudinal section, an alternator conforming to an exemplary embodiment of the invention, FIG. 2 schematically illustrates production stages of a rotor assembly of the alternator of FIG. 1, and FIGS. 3 to 11 schematically and partially illustrate examples of magnet structures according to the invention.

In the continuation of the description, arrows "A" and "R" of FIG. 1 indicate axial and radial directions respectively.

FIG. 1 shows a poly-phase rotating electrical machine 1, in this exemplary embodiment of the invention, forming an alternator for a motor vehicle. Of course, the electrical machine 1, if desired, may be reversible and form an alternator-starter, which can function in electric motor mode to start the combustion engine of the vehicle and in alternator mode to generate electrical energy.

This machine 1 comprises a casing 10 and, inside the latter, a rotor assembly 12 rotating as one with a rotary shaft 14 of axis X, called rotor shaft, and a stator 16 which surrounds rotor assembly 12.

Stator 16 comprises a body 17 formed from a stack of laminations provided with notches for assembling a stator winding 18 forming coil ends on either side of the stator body 17.

Rotor assembly 12 comprises two rotors 20 and 22, each equipped with a transverse plate 24, on the periphery of which is connected a plurality of claws 26 extending roughly along axial direction A.

Figure 2:
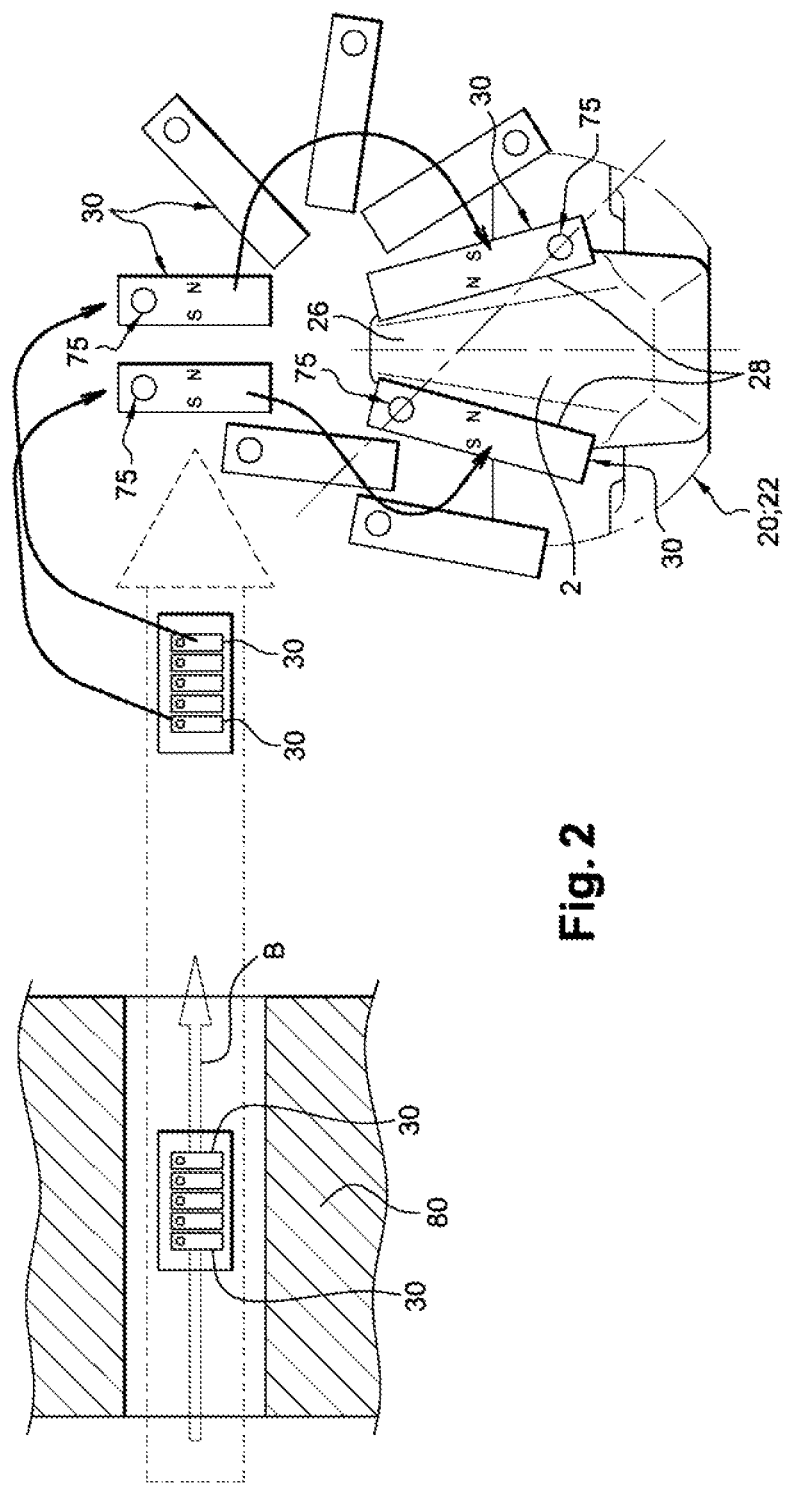

Each claw 26 has an overall trapezoidal shape when observed along radial direction R, as can be seen in particular on FIG. 2.

Claws 26 of one rotor with claws 26 of the other rotor form inter-rotor spaces 28, each suitable for accommodating a magnet structure 30.

A field winding 34 is created between the plates 24 of the rotors 20 and 22.

Each rotor 20; 22 comprises a borehole forming an internal passage 38 for accommodating the shaft 14.

The rotors 20 and 22 are made of steel for example.

The shaft 14 on its front end bears a pulley 40 belonging to a device for transmitting movement by means of at least one belt (not illustrated) between alternator 1 and the combustion engine of the motor vehicle, and at its rear end collecting rings 42 connected by wires (not illustrated) to the field winding 34 of rotor assembly 12.

Brushes of a brush holder 44 illustrated in a very diagrammatic way are positioned in such a way as to rub on the collecting rings so as to feed electric current to winding 34.

When the shaft 14 rotates and field winding 34 is activated by a power supply, the inductive rotor assembly 12 creates an induced AC current in stator 16.

Casing 10, in the example considered, consists of two parts, that is to say a front bearing 46 and a rear bearing 48 supporting brush holder 44.

Bearings 46 and 48 each contain a ball-bearing 50 and 52 respectively for the rotating support of the shaft 14.

Alternator 1 also comprises means for its cooling.

For example, as illustrated on FIG. 1, bearings 46 and 48 are ventilated to allow the alternator to be cooled by air circulation.

Rotor assembly 12, in the example described at least at one of its axial ends, comprises a fan designed to provide air circulation. A first fan 54 is arranged on the front transverse face of rotor assembly 12 and a second ventilation unit 56 is arranged on the rear face of rotor assembly 12 for example. Each fan 54 and 56 is equipped with a plurality of blades 58 and 60.

In the exemplary embodiment described, each rotor 20; 22 comprises six claws 26 so as to define a rotor assembly 12 with inter-rotor spaces 28.

Alternatively, rotor assembly 12 can comprise 2, 4, 6, 8 or 10 inter-rotor spaces 28, according to the type of electrical machine desired.

In particular with reference to FIG. 2, various production stages of rotor assembly 12 will now be described, particularly in connection with the assembly of the magnet structures 30 in inter-rotor spaces 28.

Each magnet structure 30 comprises a permanent magnet 70, for example made of rare earth, and a plate 71 made of non-magnetic material, for example composite material containing glass fibres.

In the example considered, illustrated on FIG. 3, the permanent magnet 70 has a roughly rectangular parallelepipedic shape.

This shape of the magnet is rotation invariant with an angle of 180° so that it is impossible to visually distinguish a side face 72 of north polarity and an opposite side face 73 of south polarity after magnet 70 has been magnetized.

In the method illustrated on FIG. 2, the magnet structures 30 have passed through a magnetizing device 80 designed to magnetize magnets 70 of structures 30 using a magnetic field illustrated by arrow B.

After this step each magnet 70 has north and south polarities, respectively, on its opposite faces 72 and 73.

The magnet structures 30 pass through device 80 batchwise, being aligned in parallel.

In the example described, plate 71 has a rectangular shape and entirely covers a face of the permanent magnet 70, this plate 71 being fixed on magnet 70 before passing through the magnetizing device 80.

In order to allow visual distinction between faces 72 (north) and 73 (south) of magnet 70, and thus recognition of the direction of magnetization of this magnet 70, each magnet structure 30 comprises an index mark 75.

In the example illustrated with reference to FIG. 3, the index mark 75 comprises an orifice 76 formed in plate 71, nearer to one axial end 77 than the other end 78.

Thus, in order to position the magnet structures 30 on one of the rotors 20; 22, with the magnetization of magnets 70 oriented alternating from one inter-rotor space to the next, it is possible to use the index mark 75 to visually identify a direction of orientation of the magnetization of structure 30.

For example, so that a first magnet structure 30 can be positioned in the first inter-rotor space 28, the latter is orientated so that the index mark 75 is radially on the inside and, so that a second magnet structure 30 can be positioned in the second inter-rotor space 28, this structure 30 is rotated to position it with the index mark situated on the outside (see FIG. 2).

The invention thus enables errors in the orientation of magnetization structures 30 to be avoided, which is particularly advantageous if these structures 30 are assembled manually, the operator being assisted by the magnetization mark in orientating structures 30.

It should be noted that the magnet structures 30 are fixed on one of the rotors 20; 22 before this rotor is assembled with the other rotor.

These magnet structures 30 are joined to the rotor by magnetization, before being enclosed between the two rotors 20 and 22.

In the example which has just been described, plate 71 entirely covers a magnet face 70.

Alternatively, as illustrated on FIG. 4, magnet 70 has an excess length 78 with respect to plate 71 in the longitudinal direction, at an axial end 77.

This excess length thus forms an index mark 75 within the meaning of the invention, being used to identify a direction of orientation of the magnetization of the magnet structure 30.

Plate 71 can thus be intact, with no orifice, which in particular allows its production to be simplified as regards the cutting operations.

Alternatively, as illustrated on FIG. 5, the magnet structure 30 in addition to excess length 78, has an orifice 76 in order to distinguish the sides of structure 30 in a redundant manner.

Figure 6:
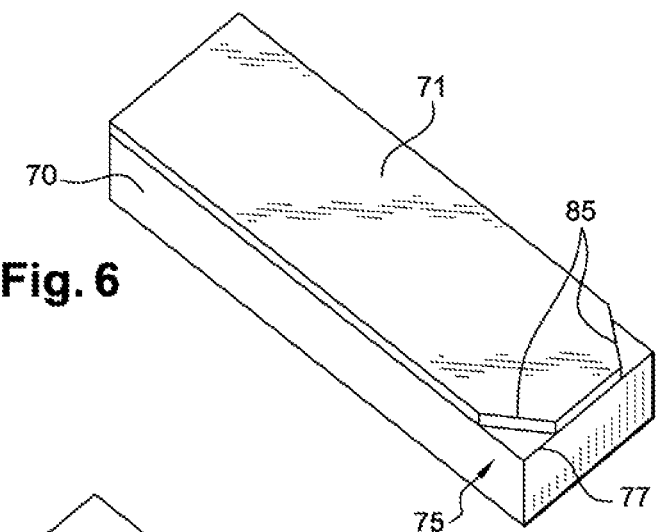

In the example illustrated on FIG. 6, plate 71 has a length equal to that of magnet 70, with cuts 85 on one axial side so as to form an index mark 75.

These cuts 85 have a triangular shape for example.

Of course, these cuts can have any other suitable shape.

For example, plate 71 can have a single rounded cut formed in the middle of an edge of plate 71.

Figure 7:
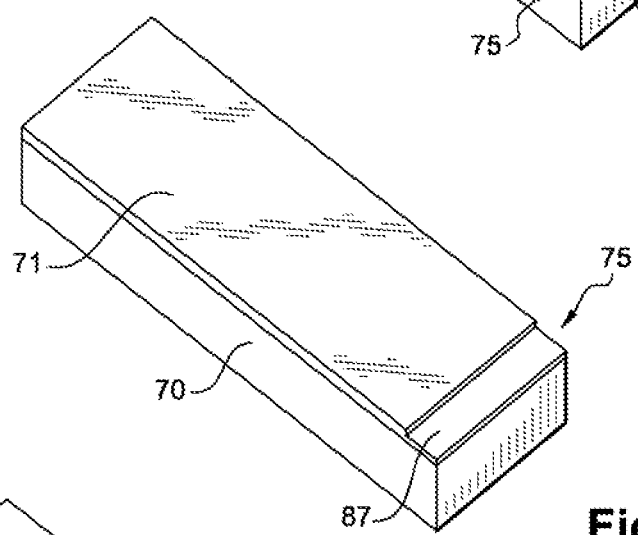

In the example illustrated on FIG. 7, plate 71 comprises a portion of reduced thickness 87, extending on one axial side of magnet 70.

This portion 87 forms an index mark 75 within the meaning of the invention.

In the examples which have just been described, the index mark 75 is formed by shapes and/or dimensions of plate 71.

Of course should the index mark be created by other means, this would not depart from the scope and spirit of the invention.

Figure 8:
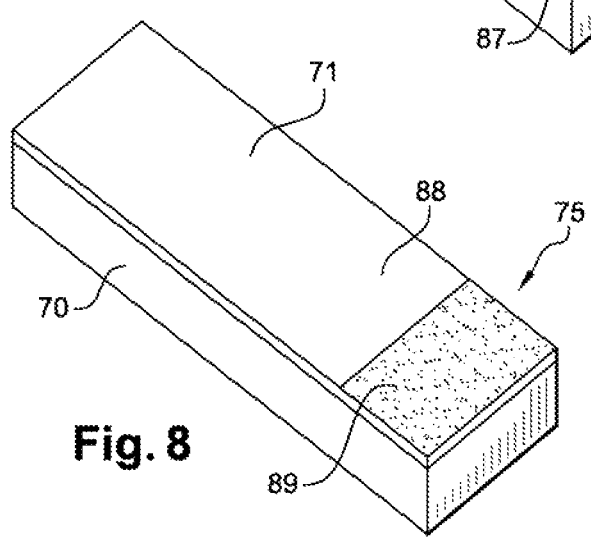

As illustrated on FIG. 8, the index mark 75 is formed by at least two zones having different optical properties, in particular being of different colours or reflective properties.

In the example considered, plate 71 comprises two, for example rectangular zones 88 and 89, of different surface areas, and having different colours.

These zones 88 and 89 extend along a width of the magnet structure.

Figure 9:
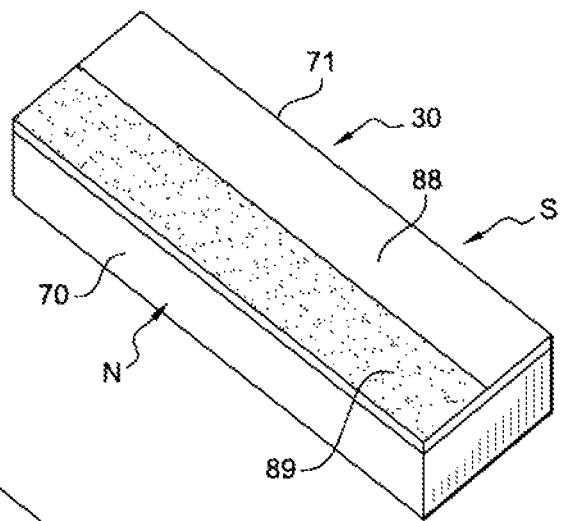

Alternatively, as illustrated on FIG. 9, zones 88 and 89 of identical surface area extend along a length of the structure.

For example, the north side (N) can be associated with a first colour of zone 89 and the south side (S) with a second colour, different from the first colour, of zone 88.

When the structures are assembled on a rotor, it is possible to position the magnet structures so that all the sides of the same colour are on the rotor.

The index mark 75, if desired, can be created on magnet 70, and not on plate 71.

Figure 10:
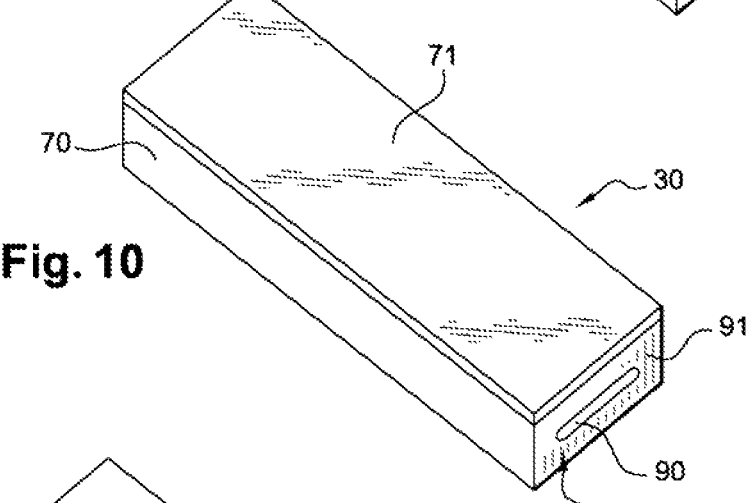

The magnet structure 30 of FIG. 10 comprises a magnet 70 and a plate 71 entirely covering a face of this magnet 70.

An index mark 75 is formed on an axial end face 91 by way of a notch 90.

This notch 90 has a rectilinear shape for example.

Alternatively, any other suitable shape of notch 90 can be considered.

For example, the notch can be circular.

Of course, the invention is not limited to the exemplary embodiments which have just been described.

For example, symmetrically on its two opposite axial ends, magnet 70 can be of a shape with rounded corners.

Plate 71, if desired, can cover at least two faces of magnet 70.

Figure 11:
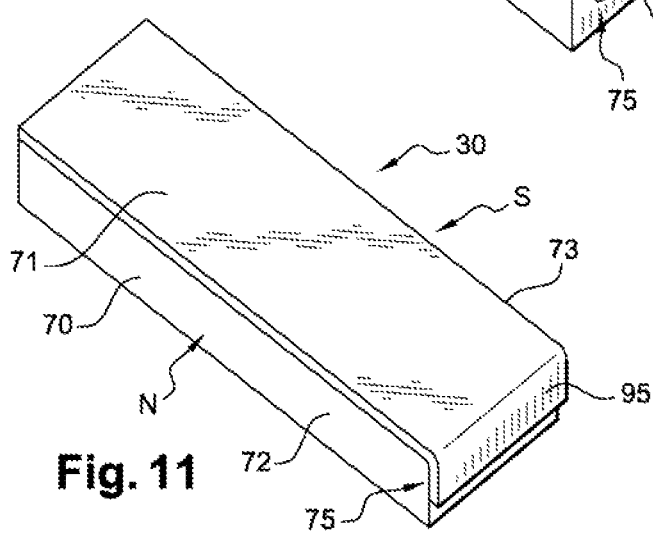

For example, as illustrated on FIG. 11, plate 71 has a portion 95 folded at right angles and covering a radial face of the permanent magnet 70. This face can be a front or rear face of the magnet.

This portion 95 is used to define an index mark 75 within the meaning of the invention.

The invention claimed is:

1. A method for producing a rotor assembly (12) for a rotating electrical machine, the rotor assembly comprising two rotors (20; 22) defining between themselves at least one inter-rotor space (28) suitable for accommodating at least one magnet structure (30) comprising at least one index mark, the method comprising the following step:

positioning the magnet structure (30) against at least one of the rotors, using the index mark (75) to identify a direction of orientation of the magnetization of the magnet structure;

the at least one magnet structure (30) having a side face (72, 73) facing a claw of the at least one of the rotors (20; 22) when positioned against the at least one of the rotors;

the at least one index mark (75) being formed on a surface of the at least one magnet structure (30) other than the side face (72, 73) thereof so as to be visible when the at least one magnet structure is assembled in the inter-rotor space of the rotor assembly (12) against the at least one of the rotors.

2. The method according to claim 1, wherein the magnet structure (30) is positioned against one of the rotors, before they are assembled.

3. The method according to claim 1, wherein the index mark (75) of the magnet structure is visible with the naked eye.

4. The method according to claim 1, wherein, in order to magnetize the magnet structures (30), the magnet structures (30) are positioned in parallel along the same direction, when they pass through a magnetizing device (80).

5. The method according to claim 1, wherein the rotor assembly (12) comprises a plurality of inter-rotor spaces (28), each being able to accommodate at least one magnet structure, the method comprising the following step:
   starting from a set of the magnet structures all having corresponding north and south poles directed the same way with respect to the index mark (75), selecting and positioning a plurality of the magnet structures on at least one of the rotors in the successive inter-rotor spaces, orientated alternating from one inter-rotor space to the other.

6. The method according to claim 5, further comprising the following step:
   selecting and making the magnet structure (30) rotate by a chosen angle using the index mark as reference, in order to place the magnet structures (30) in an adequate position before positioning it against one of the rotors.

7. A magnet structure (30) suitable for mounting in a rotor assembly (12) of a rotating electrical machine, the magnet structure (30) comprising at least one index mark (75) suitable for permitting the direction of magnetization of this magnet structure to be visually distinguished;
   the at least one magnet structure (30) having a side face (72, 73) facing a claw of at least one of rotors (20; 22) of the rotor assembly (12) when positioned against the at least one of the rotors;
   the at least one index mark (75) being formed on a surface of the at least one magnet structure (30) other than the side face (72, 73) thereof so as to be visible when the at least one magnet structure is assembled in the inter-rotor space of the rotor assembly (12) against the at least one of the rotors.

8. The magnet structure according to claim 7, wherein the magnet structure (30) comprises a plate (71) and a magnet (70) positioned against the plate, and wherein the index mark (75) is created at least partially on the plate, the index mark comprising at least one orifice (76) formed in the plate (71) or an excess length (78) of the magnet in the continuation of the length of the plate.

9. The magnet structure according to claim 8, wherein the plate (71) is made of non-magnetic material.

10. The magnet structure according to claim 9, wherein the non-magnetic material is a composite material including glass fibres.

11. The magnet structure according to claim 7, wherein the index mark is formed by two zones (88, 89) having different optical properties so that one zone having a first optical property is associated with a north side (N) and another zone having a second optical property is associated with a south side (S) different from the first optical property.

12. The magnet structure according to claim 7, comprising at least one magnet, wherein the index mark is created at least partially on the magnet.

13. The magnet structure according to claim 12, wherein the index mark comprises a notch (90) on the magnet.

14. The magnet structure according to claim 7, wherein it has a roughly rectangular parallelepipedic shape.

15. A rotor assembly (12) for a rotating electrical machine, comprising two rotors and at least one magnet structure according to claim 7, mounted in a defined inter-rotor space between the two rotors.

16. The rotor assembly according to claim 15, wherein all the magnet structures (30) have the same direction of magnetization with respect to the index mark (75).

17. A rotating electrical machine comprising a rotor assembly according to claim 16.

18. The rotor assembly according to claim 15, wherein all the magnet structures are identical.

* * * * *